United States Patent
Park et al.

(10) Patent No.: US 9,657,668 B2
(45) Date of Patent: May 23, 2017

(54) INJECTOR DRIVER AND OPERATING METHOD THEREOF

(71) Applicants: Hyundai Motor Company, Seoul (KR); Kia Motors Corporation, Seoul (KR); Hyundai Autron Company Ltd., Seongnam, Gyeonggi-Do (KR)

(72) Inventors: Choong Seob Park, Gyeonggi-do (KR); Ji Haeng Lee, Gyeonggi-do (KR); Kang Hee Cho, Gyeonggi-do (KR); Doo Jin Jang, Seoul (KR)

(73) Assignees: Hyundai Motor Company, Seoul (KR); Kia Motors Corporation, Seoul (KR); Hyundai Autron Company Ltd., Seongnam, Gyeonggi-do (KR)

( * ) Notice: Subject to any disclaimer, the term of this patent is extended or adjusted under 35 U.S.C. 154(b) by 347 days.

(21) Appl. No.: 14/168,508

(22) Filed: Jan. 30, 2014

(65) Prior Publication Data
US 2015/0154076 A1    Jun. 4, 2015

(30) Foreign Application Priority Data
Dec. 4, 2013  (KR) .................. 10-2013-0150022

(51) Int. Cl.
*G06F 11/14* (2006.01)
*F02D 41/12* (2006.01)
(Continued)

(52) U.S. Cl.
CPC ........... *F02D 41/12* (2013.01); *F02D 41/20* (2013.01); *F02D 41/266* (2013.01); *F02D 41/28* (2013.01);
(Continued)

(58) Field of Classification Search
None
See application file for complete search history.

(56) References Cited

U.S. PATENT DOCUMENTS

| 5,436,837 A * | 7/1995 | Gerstung ............ F02D 41/266 340/438 |
| 2003/0144778 A1 | 7/2003 | Miyano |
| 2010/0139618 A1 | 6/2010 | Yoon et al. |

FOREIGN PATENT DOCUMENTS

| JP | H1173203 A | 3/1999 |
| JP | 2003-214233 A | 7/2003 |

(Continued)

*Primary Examiner* — Colby M Hansen
(74) *Attorney, Agent, or Firm* — Mintz Levin Cohn Ferris Glovsky and Popeo, P.C.; Peter F. Corless

(57) ABSTRACT

An injector driver and an operating method thereof are provided in which a driving semiconductor directly controls a brake signal when a brake error occurs in driving an injector, to thus secure a safety function. The injector driver a driving semiconductor configured to transmit an interrupt signal for acknowledging whether a brake signal has been received to a micro-control unit (MCU) when a brake signal is applied. In addition, the driving semiconductor receives a brake signal recognition acknowledgement response signal from the MCU and detects whether the MCU has an error based on the brake signal recognition acknowledgement response signal reception result. Further, the driving semiconductor operates an injector driving signal when the response signal is not received from the MCU for a predetermined period of time.

9 Claims, 6 Drawing Sheets

(51) Int. Cl.
    *F02D 41/28*          (2006.01)
    *F02D 41/20*          (2006.01)
    *F02D 41/26*          (2006.01)
    F02D 41/14          (2006.01)
    F02M 21/02          (2006.01)
    B60W 50/02          (2012.01)

(52) U.S. Cl.
    CPC ........... *B60W 50/02* (2013.01); *F02D 41/123* (2013.01); *F02D 41/1495* (2013.01); *F02D 2041/286* (2013.01); *F02M 21/0293* (2013.01); *F02M 2200/00* (2013.01)

(56) References Cited

FOREIGN PATENT DOCUMENTS

| | | |
|---|---|---|
| JP | 2008151025 A | 7/2008 |
| JP | 2011127439 A | 6/2011 |
| JP | 2012036931 A | 2/2012 |

\* cited by examiner

INJECTOR DRIVER AND OPERATING METHOD THEREOF

CROSS-REFERENCE TO RELATED APPLICATION

This application is based on and claims priority from Korean Patent Application No. 10-2013-0150022, filed on Dec. 4, 2013 in the Korean Intellectual Property Office, the disclosure of which is incorporated herein in its entirety by reference.

BACKGROUND

Field of the Invention

The present invention relates to an injector driver and an operating method thereof, and more particularly, to a technique in which a driving semiconductor directly controls a brake signal when a brake error occurs in driving an injector, to thus secure a safety function.

Description of the Prior Art

Recently, when a vehicle engine supplies fuel, it receives data from various sensors within the engine. An engine control unit (ECU) determines a fuel supply amount based on the data, and an injector that injects fuel supplies the determined amount of fuel. A fuel injector is installed in an engine system of a vehicle to supply and inject fuel, and in particular, in a diesel engine vehicle, an injector is installed to directly inject fuel to an interior of a combustion chamber.

A common rail system, an example of a fuel injection device, supplies fuel from a high pressure pump to a rail. Upon receiving pressure of the rail from a pressure sensor, an ECU controls pressure of the rail and transmits a fuel injection signal to allow fuel to be injected. In the common rail system, an accelerometer is attached to the center of an engine block, and signals generated from the accelerometer are acquired every hour to adjust a pilot fuel amount to fit a state of the injector. Although a small amount of fuel is repeatedly injected by a same injector, a small amount of fuel injection needs to be managed within a predetermined deviation to fulfill an original function thereof, so fuel quantity management in pilot injection or post-injection is a critical factor.

Meanwhile, an engine controller is a device that adjusts a fuel quantity to be injected to an engine, an ignition time, and the like, on the whole to control RPM, or the like, of the engine. To ensure accurate adjustment, the engine controller receives several signals and performs an optimized engine controlling operation. Among the signals, a brake signal is an important signal for controlling a deceleration operation of the engine through an operation such as reducing an engine fuel quantity, or the like. Upon receiving the brake signal, a micro-control unit (MCU) of the engine controller determines whether to perform a deceleration operation. However, when the brake signal is not properly transmitted to the engine controller due to physical impact or if a main MCU is not normally operated due to internal or external factors (e.g., MCU failure), the MCU may not perform an accurate deceleration operation.

SUMMARY

Accordingly, the present invention provides an injector driver and an operating method thereof, in which a driving semiconductor performs cross-check on deceleration conditions together with a main micro-control unit (MCU) to stably perform deceleration operation. In addition, the present invention provides an injector driver and an operating method thereof, in which when the main MCU has an error or fails, the driving semiconductor receives a brake signal to actively control a deceleration operation of an injector.

In one aspect of the present invention, an injector driver may include: an interrupt signal generating unit configured to transmit an interrupt signal for acknowledging whether a brake signal has been received to a micro-control unit (MCU) when a brake signal is applied; a response acknowledging unit configured to receive a brake signal recognition acknowledgement response signal from the MCU; and a controller configured to detect whether the MCU has an error (e.g., a failure) based on the brake signal recognition acknowledgement response signal reception result of the response acknowledging unit, and adjust an injector driving signal when the response signal is not received from the MCU for a predetermined period of time.

In another aspect of the present invention, an injector driver may include: a micro-control unit (MCU) configured to transmit a response signal regarding whether a brake signal has been received, when an interrupt signal is received; and a driving semiconductor configured to transmit the interrupt signal when the brake signal is applied, detect whether the MCU has an error upon receiving the response signal, and adjust an injector driving signal when the response signal is not received from the MCU for a predetermined period of time.

In another aspect of the present invention, a method for operating an injector driver may include: when a brake signal is input, transmitting an interrupt signal for acknowledging whether a brake signal has been received, to a micro-control unit (MCU); receiving a response signal indicating that the brake signal has been recognized, from the MCU; and when the response signal is not received from the MCU for a predetermined period of time, adjusting an injector driving signal.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Figure 1:
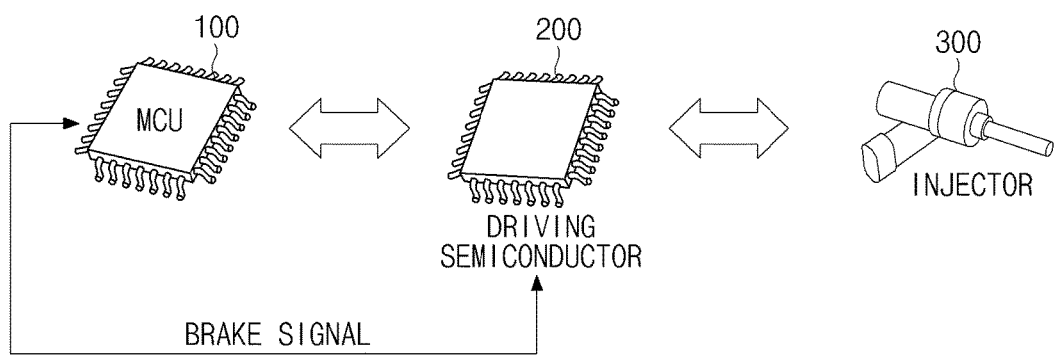
FIG. 1 is an exemplary view illustrating an injector driver according to an exemplary embodiment of the present invention.

Hereinafter, exemplary embodiments of the present invention will be described in detail with reference to the accompanying drawings FIG. 1 is an exemplary view illustrating an injector driver according to an exemplary embodiment of the present invention.

The injector driver according to an exemplary embodiment of the present invention may include a micro-control unit (MCU) or micro-controller 100, a driving semiconductor 200, and an injector 300. In particular, the MCU 100 (e.g., a first controller/controller) may be configured to receive a brake signal, determine whether to perform a deceleration operation, and output a deceleration command to the driving semiconductor 200. The MCU 100 may be configured to transmit and receive an interface signal to and from the driving semiconductor 200. The driving semiconductor 200 may be configured to adjust an injection timing of the injector 300 based on a control pulse applied from the MCU 100, and adjust a deceleration operation. In other words, the driving semiconductor 200 may be configured to adjust a deceleration operation, while continuously reducing widths of driving pulses with which the injector 300 is driven.

In an exemplary embodiment of the present invention, the driving semiconductor 200 may be configured to receive a brake signal separately, as well as the MCU 100. When the driving semiconductor 200 receives a brake signal, it may be configured to transmit an acknowledgement request signal (e.g., an interrupt signal) to the MCU 100 to acknowledge whether the MCU also has received the brake signal. Accordingly, the driving semiconductor 200 may be configured to perform a cross-check on deceleration conditions of the injector 300 together with the main MCU 100. When the main MCU 100 has an error or fails, the driving semiconductor 200 may be configured to directly determine whether to decelerate the injector 300 and adjust a deceleration operation. The injector 300 may be configured to inject fuel based on a driving control signal applied from the MCU 100 or the driving semiconductor 200. When the brake signal is recognized, the injector 300 may be driven to be decelerated under the control of the MCU 100 or the driving semiconductor 200.

Figure 2:
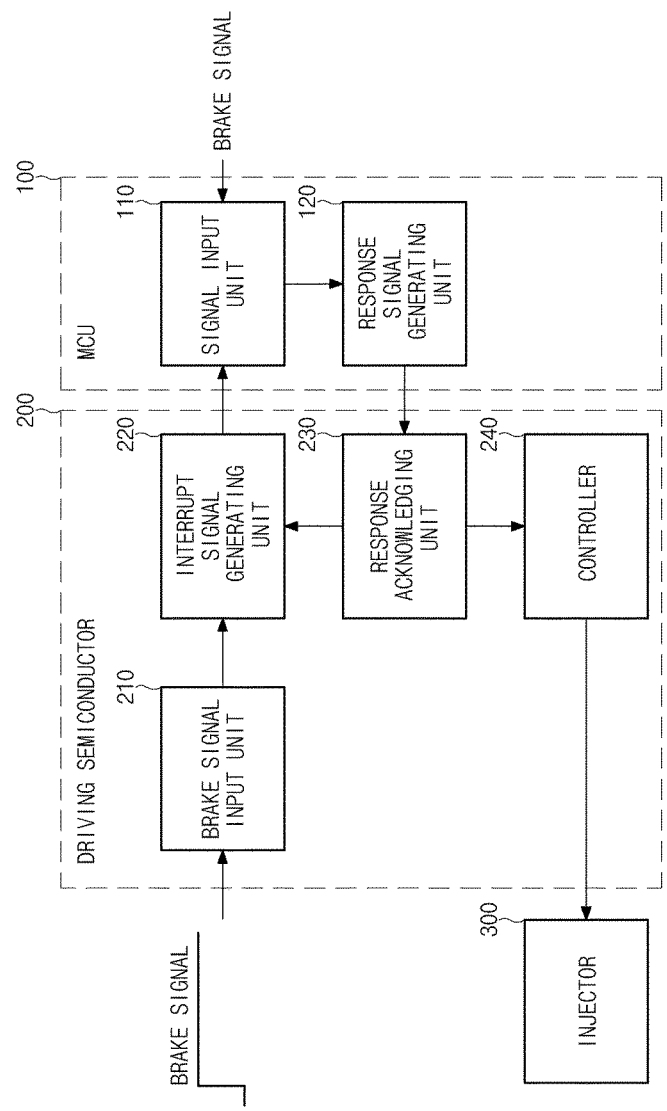
FIG. 2 is an exemplary detailed block diagram of a micro-control unit (MCU) and a driving semiconductor of FIG. 1 according to an exemplary embodiment of the present invention.

FIG. 2 is an exemplary detailed block diagram of the MCU 100 and the driving semiconductor 200 of FIG. 1. First, the MCU 100 may include a signal input unit 110 and a response signal generating unit 120 both executed by the MCU 100 (e.g., a first controller). The driving semiconductor 200 may include a brake signal input unit 210, an interrupt signal generating unit 220, a response acknowledging unit 230, and a controller 240 (e.g., a second controller).

The signal input unit 110 may be configured to receive an interrupt signal applied from the driving semiconductor 200. When an interrupt signal is applied from the signal input unit 110, the response signal generating unit 120 may be configured to output a response signal indicating that the MCU 100 has recognized the brake signal, to the driving semiconductor 200. The brake signal input unit 210 may be configured to receive the brake signal and output the brake signal to the interrupt signal generating unit 220. When the brake signal is input from the brake signal input unit 210, the interrupt signal generating unit 220 may be configured to output an interrupt signal as illustrated in FIG. 3 to the signal input unit 110 of the MCU 100.

Figure 3:
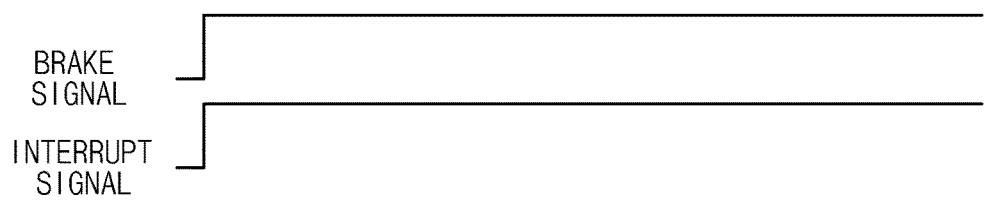
FIG. 3 is an exemplary view illustrating an operation of an interrupt signal generating unit of FIG. 2 according to an exemplary embodiment of the present invention.

When the interrupt signal generating unit 220 receives the brake signal as illustrated in FIG. 3, the interrupt signal generating unit 220 may be configured to transmit an acknowledgement request signal (e.g., an interrupt signal) that indicates receipt of the brake signal, to the signal input unit 110. In particular, the interrupt signal may be a signal that acknowledges whether the MCU 100 has also received the brake signal. Further, the response acknowledging unit 230 may be configured to receive an acknowledgement signal indicating that the MCU 100 has recognized the brake signal, from the response signal generating unit 120. When the response acknowledging unit 230 receives a brake signal recognition acknowledgement signal from the response signal generating unit 120, the response acknowledging unit 230 may be configured to output the reception result to the interrupt signal generating unit 220 and the controller 240.

Figure 4:
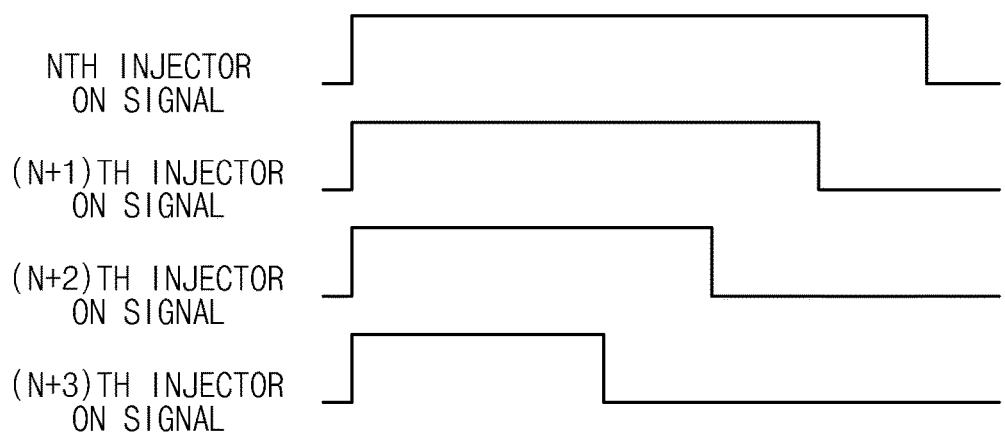
FIG. 4 is an exemplary view illustrating an operation of a controller of FIG. 2 according to an exemplary embodiment of the present invention.

The controller 240 may be configured to detect an abnormal operation of the MCU 100, and as the controller 240 receives the response acknowledgement signal from the response acknowledging unit 230, the controller may be configured to execute the injector 240 to perform a safety function. When the brake signal is applied or when the abnormal operation of the main MCU 100 is detected, the controller may be configured to adjust a deceleration operation of the injector 300 as illustrated in FIG. 4. The controller 240 may be configured to adjust the deceleration operation, while continuously reducing widths of driving pulses with which the injector 300 is driven. For example, the controller 240 may be configured to reduce a driving speed of the injector 300 by gradually reducing high level pulse widths of Nth injector ON signal, (N+1)th injector On signal, (N+2)th injector ON signal, and (N+3)th injector ON signal.

Figure 5:
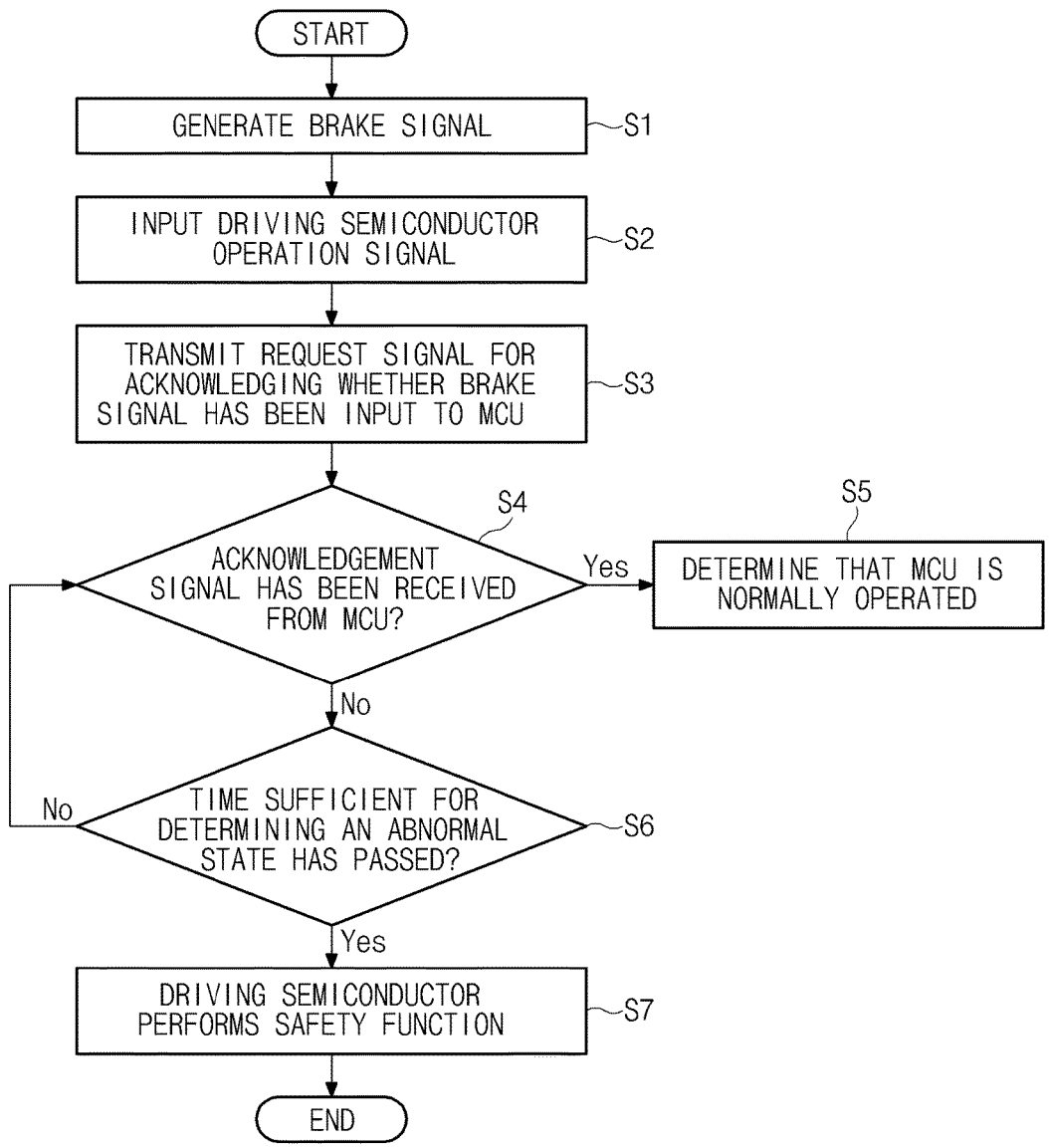
FIG. 5 is an exemplary flow chart illustrating a method for operating an injector driver according to an exemplary embodiment of the present invention.

FIG. 5 is an exemplary flow chart illustrating a method for operating an injector driver according to an exemplary embodiment of the present invention. First, in the event of a braking operation of a vehicle (e.g., when the brake is engaged), a brake signal may be input to the brake signal input unit 210 of the driving semiconductor 200 and the signal input unit 110 of the MCU 100 (operation S1). When an operation signal is input to the driving semiconductor 200, the driving semiconductor 200 may be configured to perform a corresponding operation (operation S2).

Thereafter, the interrupt signal generating unit 220 of the driving semiconductor 200 may be configured to transmit an interrupt signal to the signal input unit 110 of the MCU 100 (operation S3). In other words, the driving semiconductor 200 may be configured to transmit a request signal for acknowledging whether the brake signal has been input to the signal input unit 110 of the MCU 100. When the brake signal has been normally (e.g., without failure) received by the signal input unit 110, the response signal generating unit 120 may be configured to transmit a brake signal recognition acknowledgement response signal to the response acknowledging unit 230 of the driving semiconductor 200.

Further, the driving semiconductor (via the response acknowledging unit 230) may be configured to acknowledge whether the brake signal recognition acknowledgement response signal has been received from the response signal generating unit 120 of the MCU 100 (operation S4). The brake signal recognition acknowledgement response signal acknowledged by the response acknowledging unit 230 may be delivered to the controller 240 of the driving semiconductor 200.

When the brake signal recognition acknowledgement response signal may be received from the response signal generating unit 120, the controller 240 may be configured to determine that the MCU 100 is in a normally operated state and has not experienced a failure (operation S5). In particular, the MCU 100 may be configured to transmit a command signal for driving the injector 300 together to the controller 240. Then, the driving semiconductor 200 may be configured to adjust a deceleration operation of the injector 300 based on the driving command signal from the MCU 100. Meanwhile, the controller 240 may be configured to determine whether the brake signal recognition acknowledgement response signal has not been received from the response signal generating unit 120 for a predetermined period of time (operation S6). In particular, the controller 240 may be configured to determine a failure and abnormal state of the MCU 100. Thus, to allow the driving semiconductor 200 to perform a safety function, the controller 240 may be configured to adjust the deceleration operation of the injector 300 (operation S7). The controller 240 may be configured to notify a driver that an engine controller has an error or is failing.

Figure 6:
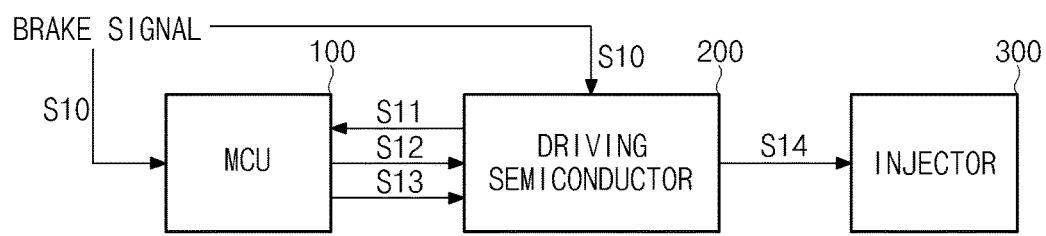
FIG. 6 is an exemplary view illustrating the method for operating an injector driver according to an exemplary embodiment of the present invention.

FIG. 6 is an exemplary view illustrating the method for operating an injector driver according to an exemplary embodiment of the present invention. First, an operational process performed when the MCU 100 is in a normal state without an error will be described as follows.

In operation S10, a brake signal may be input to both the MCU 100 and the driving semiconductor 200. In operation S11, the driving semiconductor 200 may be configured to transmit a brake signal recognition acknowledgement request signal to the MCU 100. Thereafter, in operation S12, the MCU 100 may be configured to transmit a brake signal recognition acknowledgement response signal to the driving semiconductor 200. The response signal generating unit 120 of the MCU 100 may be configured to clear (e.g., erase, delete, etc.) an interrupt signal using a serial peripheral interface (SPI). In operation S13, the MCU 100 may be configured to transmit a driving command signal for normally driving the injector 300 to the driving semiconductor 200. Thereafter, in operation S14, the driving semiconductor 200 may be configured to output a deceleration operation command for normally driving the injector 300 to the injector 300.

An operational process performed when the MCU 100 is in an abnormal state with an error will be described as follows. In operation S10, a brake signal may be input to both the MCU 100 and the driving semiconductor 200. In operation S11, the driving semiconductor 200 may be configured to transmit a brake signal recognition acknowledgement request signal to the MCU 100. Thereafter, in operation S12, when an error occurs in the MCU 100, the MCU 100 may not transmit a brake signal recognition acknowledgement response signal to the driving semiconductor 200. Then, the response acknowledging unit 230 of the driving semiconductor 200 may not receive a response signal from the MCU 100 for an abnormal state determination time. In particular, the abnormal state determination acknowledgment time may be set in advance in the controller 240 of the driving semiconductor 200. Thus, in operation S13, the driving semiconductor 200 may be configured to operate the injector 300 based on an operation command signal from the MCU 100 for the abnormal state determination acknowledgment time. When the abnormal state determination acknowledgment time has lapsed, the injector 300 may be decelerated and operated based on a control signal stored within the controller 240 of the driving semiconductor 200, rather than the MCU 100, as in operation S14.

According to the exemplary embodiment of the present invention, the following advantages are provided. First, a driving semiconductor may be configured to perform cross-check regarding deceleration conditions together with a main MCU, to stably perform a deceleration operation. Second, when the main MCU has a failure, the driving semiconductor may be configured to receive a brake signal and actively adjust a deceleration operation of an injector.

Also, the exemplary embodiments of the present invention have been described in detail, but the scope of the present invention is not limited thereto and various variants and modifications by a person skilled in the art using a basic concept of the present invention defined in claims also belong to the scope of the present invention. It should be interpreted that the scope of the present invention is defined by the following claims rather than the above-mentioned detailed description and all modifications or alterations deduced from the meaning, the scope, and equivalences of the claims are included in the scope of the present invention.

What is claimed is:

1. An injector driver comprising:
   an interrupt signal generating unit configured to transmit an interrupt signal for acknowledging whether a brake signal has been received to a micro-control unit (MCU) when a brake signal is applied in the event of a braking operation of a vehicle;
   a response acknowledging unit configured to receive a brake signal recognition acknowledgement response signal from the MCU; and a controller configured to detect whether the MCU has an error based on a brake signal recognition acknowledgement response signal reception result of the response acknowledging unit, and control an injector driving signal for an injector by itself when the brake signal recognition acknowledgment response signal is not received from the MCU for a predetermined period of time.

2. The injector driver according to claim 1, further comprising a brake signal input unit configured to receive the brake signal.

3. The injector driver according to claim 1, wherein when the brake signal recognition acknowledgement response signal is received from the MCU within the predetermined period of time, the controller of a driving semiconductor is configured to operate the injector based on a command signal applied from the MCU.

4. The injector driver according to claim 1, wherein the controller of a driving semiconductor is configured to operate the injector based on a command signal from the MCU for an abnormal state determination time during which whether the MCU has an error is determined.

5. An injector driver comprising:
 a micro-control unit (MCU) configured to transmit a response signal regarding whether a brake signal has been received, when an interrupt signal is received; and
 a driving semiconductor configured to transmit the interrupt signal when the brake signal is applied, detect whether the MCU has an error upon receiving the response signal, and operate an injector driving signal for an injector by itself when the response signal is not received from the MCU for a predetermined period of time.

6. The injector driver according to claim 5, wherein the driving semiconductor includes:
 an interrupt signal generating unit configured to transmit the interrupt signal for acknowledging whether the brake signal has been received to the micro-control unit (MCU) when the brake signal is applied in the event of a braking operation of a vehicle;
 a response acknowledging unit configured to receive the response signal acknowledging whether the brake signal has been recognized from the MCU; and
 a controller configured to control the injector driving signal by itself when the response signal is not received from the MCU for the predetermined period of time.

7. The injector driver according to claim 6, further comprising a brake signal input unit configured to receive the brake signal.

8. The injector driver according to claim 5, wherein when the response signal is received from the MCU within the predetermined period of time, the driving semiconductor is configured to operate the injector based on a command signal applied from the MCU.

9. The injector driver according to claim 5, wherein the driving semiconductor is configured to operate the injector based on a command signal from the MCU for an abnormal state determination time during which whether the MCU has an error is determined.

* * * * *